United States Patent
Ha et al.

[11] Patent Number: 5,933,432
[45] Date of Patent: Aug. 3, 1999

[54] MAPPING APPARATUS FOR USE IN A SYNCHRONOUS MULTIPLEXER

[75] Inventors: Jae-Sul Ha; Sang-Yong Lee, both of Incheon, Rep. of Korea

[73] Assignee: Daewoo Telecom, Ltd., Incheon, Rep. of Korea

[21] Appl. No.: 08/915,633

[22] Filed: Aug. 21, 1997

[30] Foreign Application Priority Data

Aug. 23, 1996 [KR] Rep. of Korea ................. 96-35242
Aug. 23, 1996 [KR] Rep. of Korea ................. 96-35247

[51] Int. Cl.$^6$ ................................................. H04J 3/06
[52] U.S. Cl. ................................... 370/505; 375/371
[58] Field of Search ................................ 370/466, 474, 370/476, 504, 505, 528; 375/363, 372, 373, 371

[56] References Cited

U.S. PATENT DOCUMENTS

| | | | |
|---|---|---|---|
| 5,111,485 | 5/1992 | Serack | 375/371 |
| 5,206,858 | 4/1993 | Nakano et al. | 370/465 |
| 5,268,936 | 12/1993 | Bernardy | 375/372 |
| 5,457,717 | 10/1995 | Bellamy | 375/372 |
| 5,471,511 | 11/1995 | De Langhe et al. | 375/376 |
| 5,537,447 | 7/1996 | Urbansky | 375/372 |
| 5,563,891 | 10/1996 | Wang | 375/372 |
| 5,699,391 | 12/1997 | Mazzurco et al. | 375/372 |
| 5,764,637 | 6/1998 | Nishihara | 370/397 |
| 5,790,557 | 8/1998 | Lee et al. | 370/535 |

*Primary Examiner*—Chau Nguyen
*Assistant Examiner*—Kenneth Vanderpuye
*Attorney, Agent, or Firm*—Pennie & Edmonds LLP

[57] ABSTRACT

An apparatus is used for mapping digital signal data in a data packet of a packet clock having a plurality of clock pulses wherein the data packet is composed of information data and the digital data. The ratio of the number of bits of the information data with respect to the number of bits in the data packet is M/N with M and N being positive integers and the information data includes overhead data bits and one or more data bits. The apparatus comprises a counter for counting the clock pulses to provide counted values; a gapping signal generator for generating gapping control signals based on the counted values and the ratio M/N, wherein an M number of gapping control signals are generated for every N clock pulses; and gapping device for finding overhead data bits among the information data and gapping clock pulses corresponding to the overhead data bits in response to the gapping control signals.

7 Claims, 7 Drawing Sheets

MAPPING APPARATUS FOR USE IN A SYNCHRONOUS MULTIPLEXER

FIELD OF THE INVENTION

The present invention relates to a synchronous multiplexer; and, more particularly, to an apparatus for use in a synchronous multiplexer for mapping digital signal data in a virtual container.

BACKGROUND OF THE INVENTION

In most synchronous transmission systems, multiplexing technology is widely employed to accommodate as many data channels as possible in a given path. According to a synchronous digital hierarchy (SDH) recommended by the International Standards Union-Telecommunications Sector, digital signal level 1 (DS-1) data or digital signal level 1 of Europe (DS-1E) data is multiplexed to form synchronous transport module level N (STM-N) data through the use of various data packets of containers, virtual containers (VC's), tributary units, and administrative units, wherein the DS-1 and the DS-1E data represent 1.544 Mbps pulse code modulated (PCM) serial data having 24 voice channels and 2.048 Mbps PCM serial data containing 32 voice channels, respectively.

Among the steps of generating the STM-1 from the DS data (DS-1 data or DS-1E data), the present invention relates to a mapping process of the DS data in data packets, e.g., VC's (VC-11's or VC-12's), wherein the VC-11 and the VC-12 are made of the DS-1 and the DS-1E data, respectively.

Conventionally, mapping methods of received data in sending data are classified into an asynchronous mapping, a bit synchronous mapping and a byte-synchronous mapping.

In the synchronous mapping, the clock of received data is matched with that of the sending data. On the other hand, in the asynchronous mapping, the clock frequency of the received data is different from that of the sending data.

In the asynchronous mapping, since the clock frequency of received data is different from that of the sending data, i.e., the clock frequency of the sending data is faster than that of the received data, bit stuffing or gapping of the clock frequency is required to prevent transmission errors.

Referring to FIG. 1A, there is shown a structural diagram of the VC-11. The VC-11 contains 4 frames in 500 $\mu$s, and each frame in 125 $\mu$s is composed of 2 information bytes and 24 data bytes. The respective information bytes of the first to fourth frame include a low path overhead (V5) byte and eight bits of R, R, R, R, R, R, I and R; a J2 byte and a Y1 byte having C1, C2, 0, 0, 0, 0, I and R; a Z6 byte and a Y2 byte of C1, C2, 0, 0, 0, 0, I and R; a Z7 byte and a Y3 byte having C1, C2, R, R, R, S1, S2 and R. As used herein, R represents a fixed stuffing bit; I, a data bit; C1 and C2, justification control bits; S1 and S2, specification opportunity bits; 0, a supplementary bit; and J2, Z6 and Z7 bytes are reserved bytes for other applications. As is well known in the art, among the information bytes, the V5, the J2, the Z6 and the Z7 bytes, the R, the C1, the C2, and 0 bits are overhead data; and three I bits and four 24 data bytes are payload data coming from the DS data. The S1 or the S2 bit may present overhead data or payload data depending on the C1 and the C2 bits.

Referring to FIG. 1B, there is depicted a structural diagram of the VC-12. The VC-12 also contains 4 frames in 500 $\mu$s. The respective information bytes of the first to third frame include a low path overhead (V5) byte and two R* bytes; a J2 byte, a Y1 byte having C1, C2, 0, 0, 0, 0, R and R and a R* byte; a Z6 byte, a Y2 byte of C1, C2, 0, 0, 0, 0, R and R and a R* byte. The information bytes of the fourth frame includes a Z7 byte, a Y3 byte having C1, C2, R, R, R, R, R and S1 and a R* byte. And an S2 bit in the fourth frame is a information bit. As used herein, R represents a fixed stuffing bit; C1 and C2, justification control bits; S1 and S2, specification opportunity bits; 0, a supplementary bit; R* byte, a fixed stuffing byte; and J2, Z6 and Z7 bytes are reserved bytes for other applications. Among the information bytes, the V5, the R*, the J2, the Z6 and the Z7 bytes, the R, the C1, the C2 are overhead data; and three 32 bytes of the first to third frame, and 32 bytes—1 bit of the fourth frame are payload data coming from the DS data. The S1 or the S2 bit may present overhead data or payload data depending on the C1 and the C2 bits.

Referring to FIG. 2, there is illustrated a block diagram of a conventional apparatus 100 for mapping the DS data in the VC's. The mapping apparatus 100 comprises a write address generator 210, a buffer 220, a read address generator 230, an overhead gapping device 240 and a control signal generator 250.

The DS data and a DS clock from a primary multiplexer (not shown), a VC clock and a V5 clock from a VC clock generator (not shown) and a first control signal representing the C1 bit from a stuffing controller (not shown) are inputted to the apparatus 100.

The DS data is inputted to the buffer 220 and the DS clock is provided to the write address generator 210. The write address generator 210, a binary counter, provides a write address for each bit of the DS data and a most significant bit of the write address (WADDMSB) to the buffer 220 and the control signal generator 250, respectively, based on the DS clock. The buffer 220 stores the DS data in the area designated by the write addresses.

Most significant bits of read addresses (RADDMSB's) generated from the read address generator 230 via a line L231, WADDMSB's on a line L211 and the V5 clock are provided to the control signal generator 250. The control signal generator 250 has two D flip-flop (D F/F) circuits, wherein a first D F/F latches a WADDMSB at the changeover of the RADDMSB's from a first logic level, e.g., 1, to a second logic level, e.g., 0, thereof and a second D F/F latches the output of the first D F/F at the onset of the V5 clock. The V5 clock is an initiation signal representing the beginning of a VC. The output from the control signal generator 250 is provided to the overhead gapping device 240 as a second control signal representing the C2 bit. In other words, the C2 bit for a current VC corresponds to a WADDMSB of a previous VC latched from the control signal generator 250 at the onset of the V5 clock for the current VC.

The overhead gapping device 240 gaps clock pulses of the VC clock in response to the V5 clock and the first and the second control signals, i.e., C1 and C2 bits. Specially, the overhead gapping device 240 starts, in response to the V5 clock, gapping clock pulses of the VC corresponding to the V5, J2, Z6 and Z7 bytes, R bits, C1 and C2 bits and zero bits included in the information bytes shown in FIG. 1. Gapping of the S1 and the S2 bits in the information bytes is carried out based on the C1 and C2 bits. For instance, the respective clock pulses corresponding to the S1 and S2 bits are gapped only when the C1 and the C2 bits are zero valued, or vice versa. As is well known, the C1 bit is fixedly determined to 1 for a VC at a rate of 3 by 5 VC's and 0 at a rate of 2 to 5 VC's. For instance, C1 bits are assigned as "1, 0, 1, 0, 1" for each set of 5 consecutive VC's.

The gapped VC clock is then fed to the read address generator 230, which generates a read address for each ungapped clock pulses of the gapped VC clock. The read addresses and most significant bits thereof (RADDMSB's) are provided to the buffer 220 and the control signal generator 250, respectively. At the buffer 220, the stored DS data is retrieved in accordance with the read address and transmitted to an overhead adder (not shown), wherein the overhead data is inserted to the retrieved data from the buffer 220 at the corresponding portion of the gapped VC clock pulses, thereby providing a VC.

Referring to FIG. 3, there is depicted a timing chart illustrating the operation of the apparatus 100 shown in FIG. 2.

The DS clock, e.g., DS1 clock of 1.544 Mbps, is shown on the first line, and the write addresses generated from the write address generator 210 are also illustrated on the second line. The third line is the V5 clock initiating the formation of a VC. The VC clock, e.g., VC-11 clock of 1.664 Mbps, is shown on the fourth line and the fifth line illustrates the output of the overhead gapping device 240 wherein the VC clock is gapped with pulse intervals allocated to the overhead data. The sixth line depicts read addresses obtained by using the gapped VC clock.

In the prior art gapping apparatus, however, gapping of the VC clock is carried out by gapping consecutive clock pulses therein which corresponds to the overhead data, as shown in FIG. 3; and, therefore, the duration of the gapped portion of the VC clock becomes much longer than the VC clock period, which tends to generate a jitter in the gapped VC clock and retrieved data from the buffer 220.

SUMMARY OF THE INVENTION

It is, therefore, a primary object of the present invention to provide an apparatus capable of reducing jitter generation in the asynchronous mapping process of the synchronous transmission systems.

In accordance with the invention, there is provided an apparatus for mapping digital signal data in a data packet of a packet clock having a plurality of clock pulses wherein the data packet is composed of information data and the digital data, the ratio of the number of bits of the information data with respect to the number of bits in the data packet being M/N with M and N being positive integers and the information data including overhead data bits and one or more data bits. The apparatus comprises counter for counting the clock pulses to provide counted values; gapping signal generator for generating gapping control signals based on the counted values and the ratio M/N, wherein an M number of gapping control signals are generated for every N clock pulses; and gapping device for finding overhead data bits among the information data and, responsive to the gapping control signals, for gapping clock pulses corresponding to the overhead data bits.

BRIEF DESCRIPTION OF THE DRAWINGS

The above and other objects and feature of the present invention will become apparent from the following description of preferred embodiments given in conjunction with the accompanying drawings, in which.

DETAILED DESCRIPTION OF THE PREFERRED EMBODIMENTS

Figure 4:
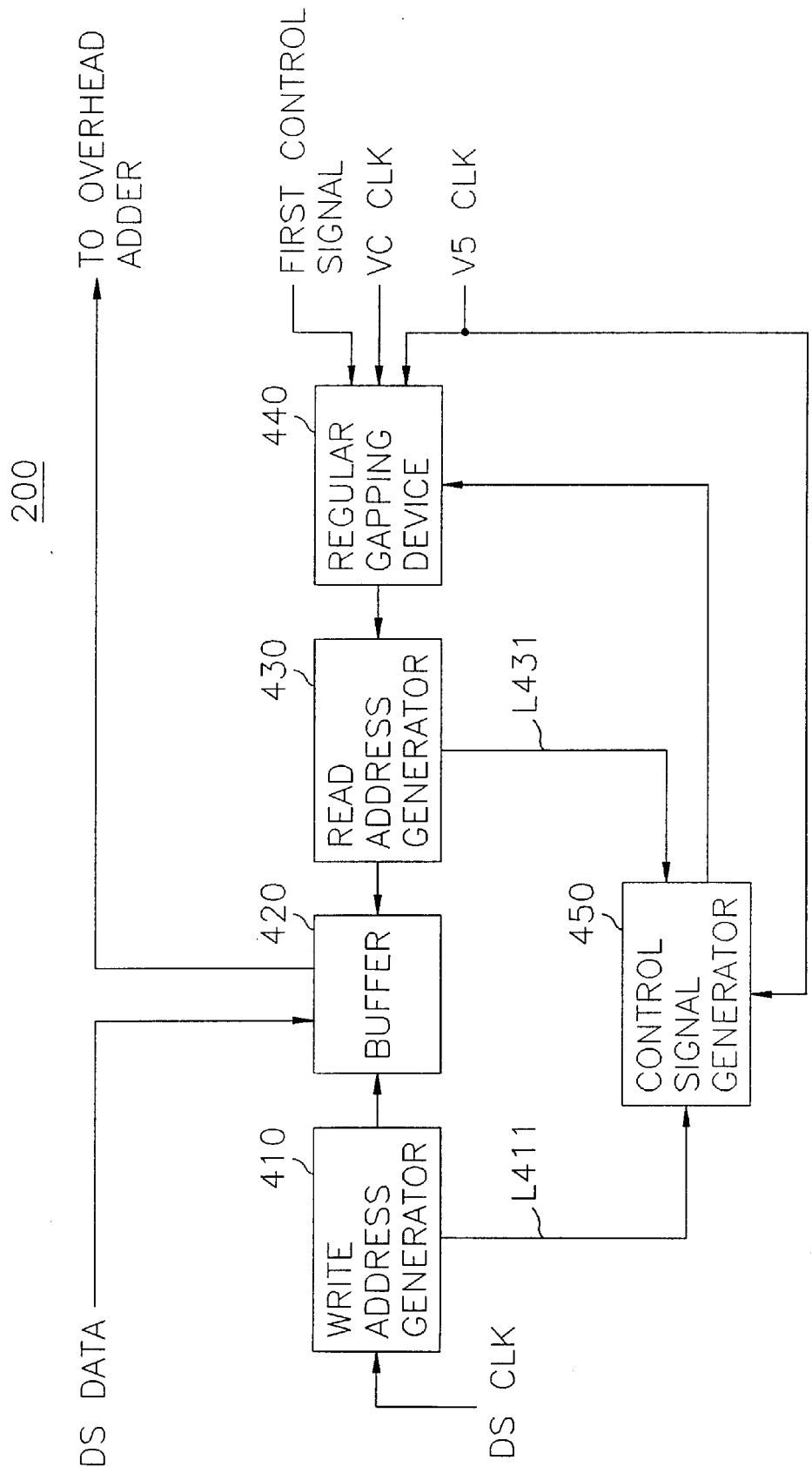
FIG. 4 presents a block diagram of a mapping apparatus in accordance with the present invention.

Referring to FIG. 4, there is provided a mapping apparatus 200 in accordance with the present invention, wherein the mapping apparatus 200 comprises a write address generator 410, a buffer 420, a read address generator 430, a regular gapping device 440 and a control signal generator 450.

DS data and a DS clock from a primary multiplexer (not shown), a VC clock and a V5 clock from a VC clock generator (not shown) and a first control signal from a stuffing controller (not shown) are inputted to the apparatus 200, the first control signal representing a C1 bit.

The DS data and the DS clock signal are inputted to the buffer 420 and the write address generator 410, respectively. The write address generator 410, a binary counter, counts the DS clock and provides a write address for each bit of the DS data and a most significant bit of the write address (WADDMSB) to the buffer 420 and the control signal generator 450 respectively. The buffer 420 stores the DS data at corresponding storage area therein in response to the write addresses.

Figure 2:
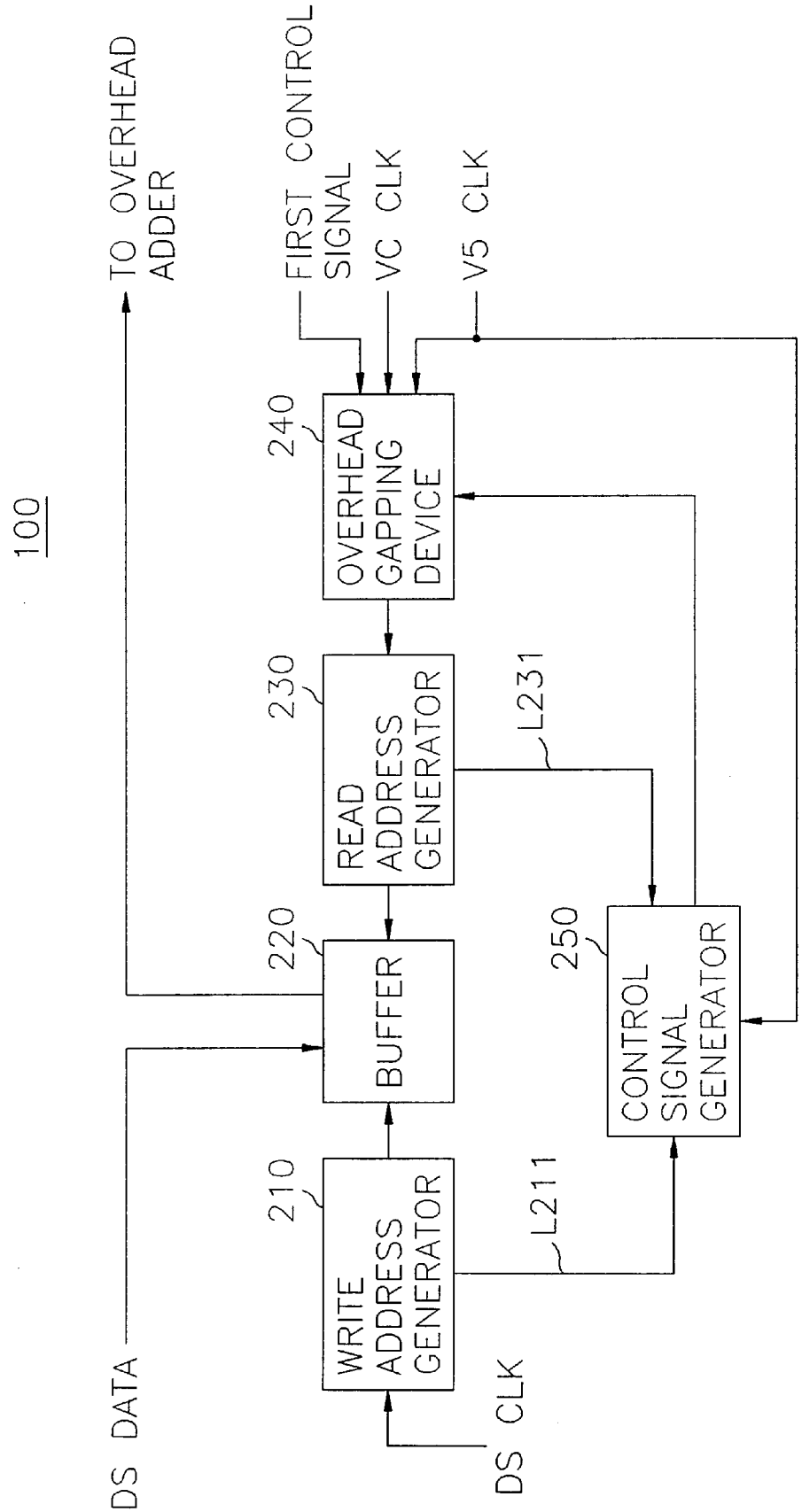
FIG. 2 shows a block diagram of a conventional mapping apparatus in a synchronous multiplexer.

The control signal generator 450, responsive to the V5 clock, most significant bits of the read addresses (RADDMSB's) on a line L431 and WADDMSB's on a line L411, provides a second control signal representing a C2 bit to the regular gapping device 440. The function and features of the write address generator 410, the buffer 420 and the control signal generator 450 are basically identical to those of the elements 210, 220 and 250 included in the conventional mapping apparatus 100 shown in FIG. 2.

Figure 5:
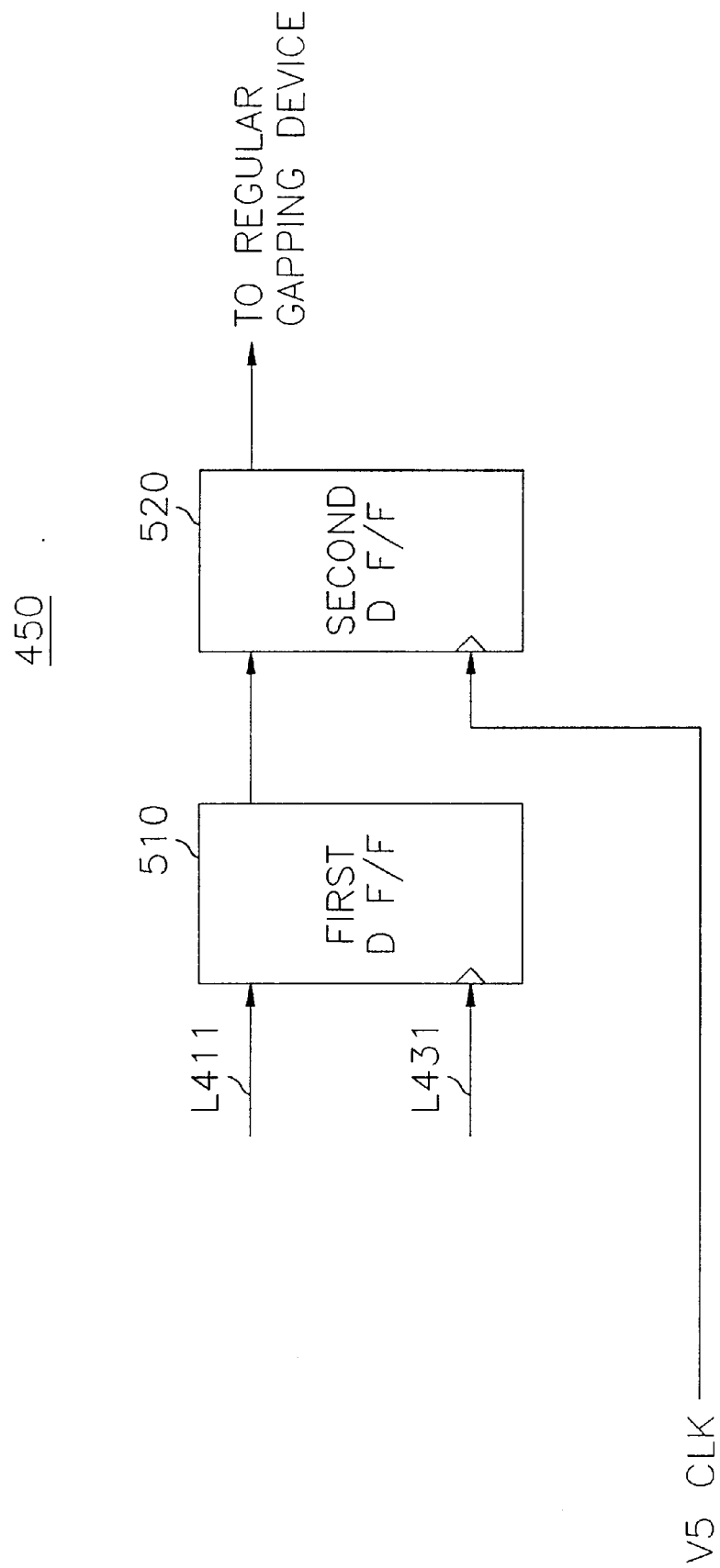
FIG. 5 provides a detailed block diagram of the control signal generator shown in FIG. 4.

Referring to FIG. 5, there is depicted a detailed block diagram of the control signal generator 450 which includes a first D flip-flop (D F/F) 510 and a second D flip-flop (D F/F) 520.

The WADDMSB's via the line L411 from the write address generator 410 and the RADDMSB's via the line L431 from the read address generator 430 shown in FIG. 4, are inputted to the first D F/F 510. The first D F/F 510 latches a WADDMSB at the changeover of the RADDMSB's from a first logic level, e.g., 1, to a second logic level, e.g., 0, thereof.

Figure 3:
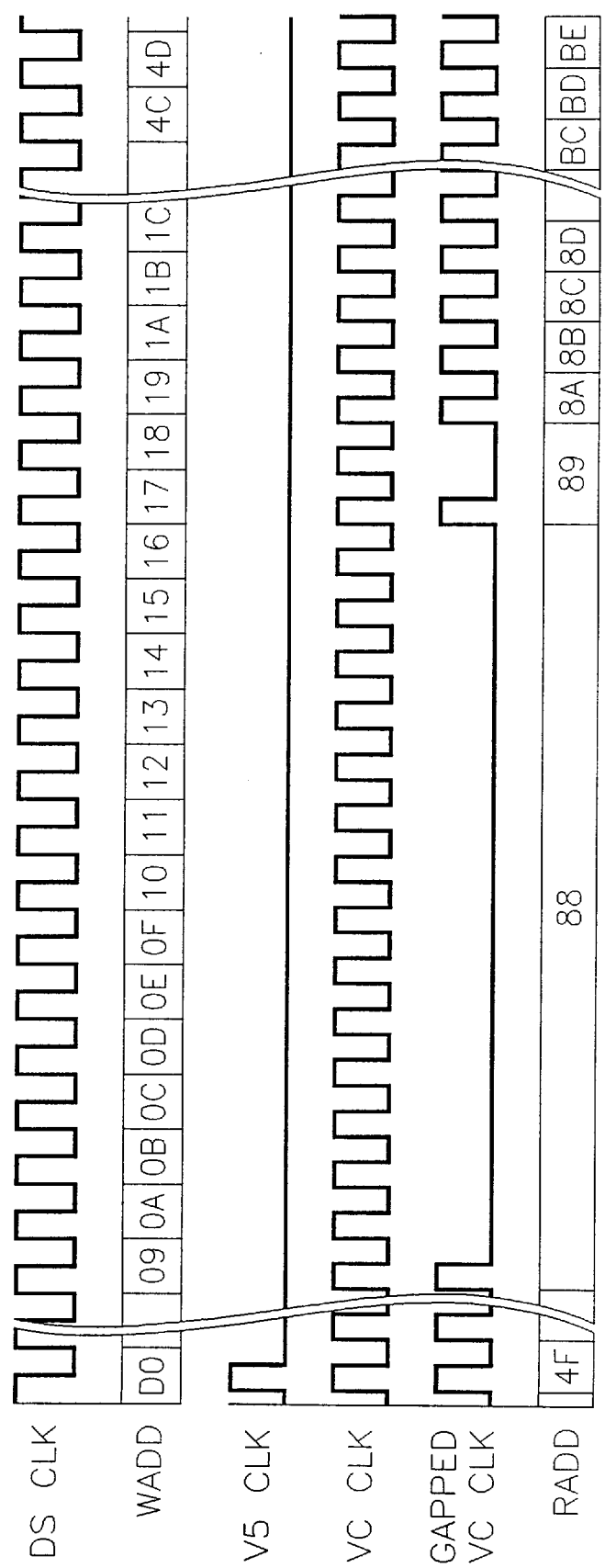
FIG. 3 illustrates a timing chart describing the conventional mapping process.

The second D F/F 520 latches the output of the first D F/F 510 at the onset of the V5 clock, such as the shown in FIG. 3, wherein the V5 clock is an initiation signal representing beginning of a VC. The latched output from the second D F/F is fetched to the regular gapping device 440 shown in FIG. 4, as a second control signal representing a C2 bit. In other words, the C2 bit for a current VC corresponds to a WADDMSB of a previous VC latched from the control signal generator 450 at the onset of the V5 clock for the current VC.

Turning back to FIG. 4, the regular gapping device 440 receives the first control signal, the VC clock, the V5 clock and the second control signal and serves to regularly gap clock pulses of the VC clock in response to the VS clock and the first and the second control signals, i.e., C1 and C2 bits in accordance with the present invention.

Figure 6:
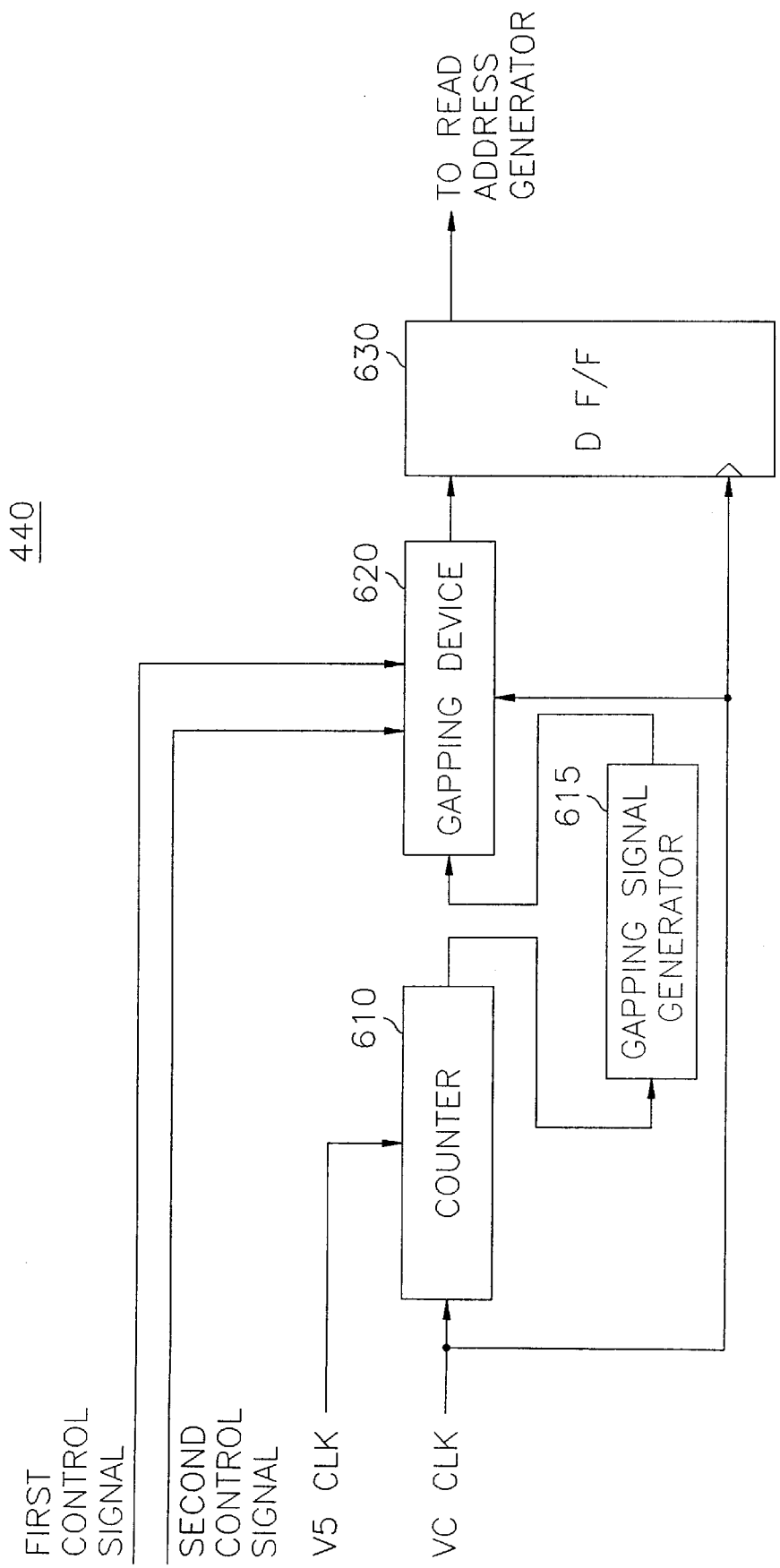
FIG. 6 depicts a detailed block diagram of the regular gapping device shown in FIG. 4.

Referring to FIG. 6, there is depicted a detailed block diagram of the regular gapping device 440 which includes a counter 610, a gapping signal generator 615, a gapping device 620, and a D flip-flop (D F/F) 630.

The VC clock is inputted to the counter 610, the gapping device 620, and the D F/F 630; and the V5 clock is provided to the counter 610; and the first and the second control signals are inputted to the gapping device 620.

The counter 610 starts counting the clock pulses of the VC clock in response to the V5 clock, i.e., at the onset thereof. In a preferred embodiment of the invention, the counted value is of a modulus (M+1). That is, the counter 610 counts clock pulses up to M and reset thereafter. M is preferably set to 13 and 35 in mapping the DS-1 data into the VC-11 and the DS-1E data into the VC-12, respectively.

Referring back to FIGS. 1A and 1B, 1/13 of the VC-11 data corresponds to the information data; and about 3/35 of the VC-12 data belong to the information data, wherein in the VC-12 data, each of the first three frames of 35 bytes includes 3 bytes of information data and the fourth frame includes 3 bytes+1 bit information data. The counted values from the counter 610 is fed to the gapping signal generator 615. The gapping signal generator 615 generates gapping control signals in response to the counted values from the counter 610. Specially, in mapping the DS-1 data, the gapping signal generator 615 generates a gapping control signal for each ith counted value, i being one of a predetermined integer from 1 to 13. In other words, a gapping control signal is provided for every 13 clock pulses of the VC clock at the gapping signal generator 615.

In mapping the DS-1E data, a gapping signal generator 615 generates a gapping control signal for each of kth, lth, mth counted values, each of k, l and m being one of a preset integer from 1 to 35 and different each other. In other words, three gapping control signals are provided for every 35 clock pulses of the VC clock at the gapping signal generator 615.

The gapping control signals generated from the gapping signal generator 615 are provided to the gapping device 620.

Figure 1A:
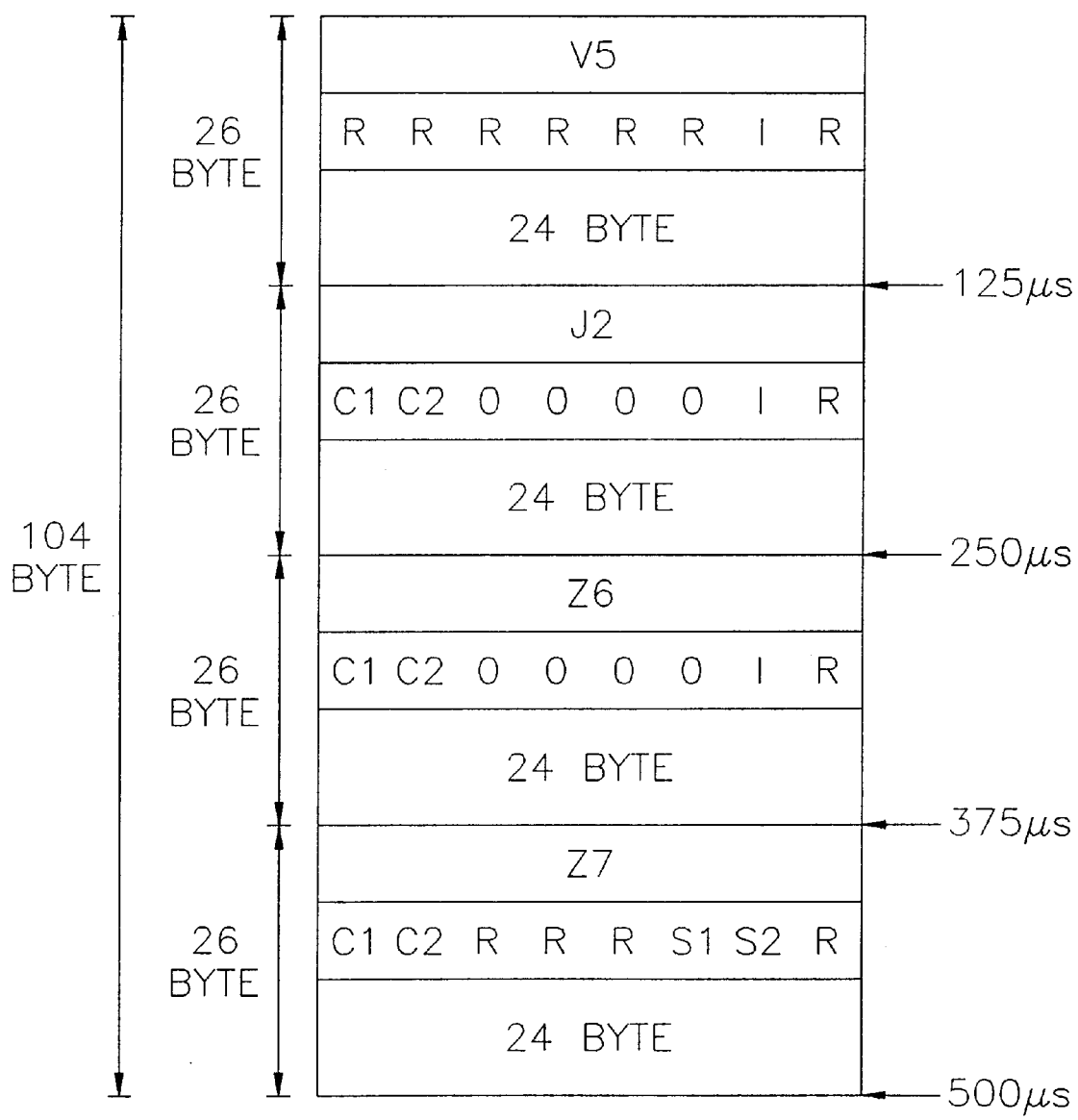
FIGS. 1A and 1B offer a structural diagram of a VC-11 and VC-12, respectively.

As shown in FIG. 1A, the 15th information bits of the first three frames in the VC-11 are I bits and the 14th and 15th information bits of the fourth frame are S1 and S2 bits. Accordingly, the gapping device 620 of the present invention gaps clock pulses of the VC clock corresponding to gapping control signals other than 15th, 31th, 47th, 62th and 63th gapping control signals, wherein the 15th, the 31th and the 47th gapping control signals correspond to the I bits and the 62th and the 63th gaping control signals correspond to the S1 and the S2 bits.

Figure 1B:
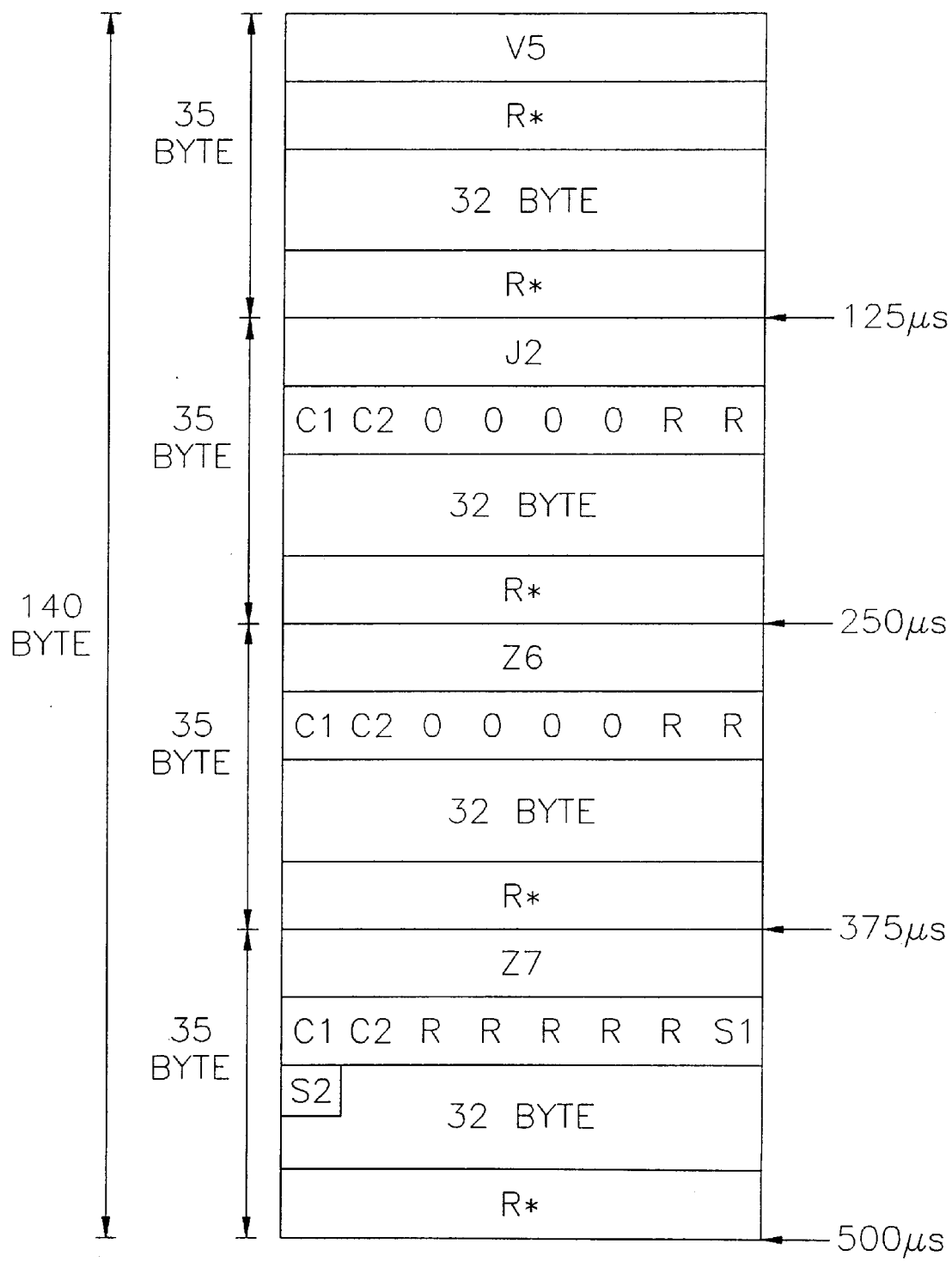

As for the case of the VC-12 shown in FIG. 1B, the information bytes of frames in the VC-12 do not include any I bits therein and the 16th bit of the information bytes and the first bit of the 32 data bytes of the fourth frame are the S1 and the S2 bits, respectively. Accordingly, in mapping of the DS-1E data, the gapping device 620 gaps all clock pulses of the VC clock corresponding to the gapping control signals, excepting the one corresponding to the S1 bit, i.e., the 88th gapping control signal.

Gapping of the clock pulses corresponding to the S1 and the S2 bits are determined with reference to the C1 and the C2 bits both in the VC-11 and the VC-12 formats. More specially, similarly as on the conventional gapping process, the S1 (or S2) bit is set as overhead data if the C1 (or C2) bit is of a first logic level, e.g., 1; and the S1 (or S2) bit is set as payload data if the C1 (or C2) bit is of a second logic level, e.g., 0.

As a consequence, in mapping of the DS-1 data, the gapping device 620 of the present invention gaps or ungaps the clock pulse corresponding to the S1 bit, i.e., 62th gapping control signals, depending on whether the C1 bit is of first or the second logic level; and, similarly, the clock pulse of the VC clock corresponding to the 63th gapping control signal, i.e., the S2 bit, is gapped or ungapped when the C2 bit is of the first or the second logic level.

In mapping of the DS-1E data, if the C1 bit is of the first logic level, the clock pulse corresponding to the 88th gapping control signal generated for the S1 bit of the VC-12 is gapped; and otherwise, the clock pulse is not gapped. As for the S2 bit of the VC-12, a gapping control signal is not generated therefor from the gapping signal generator 615 and the S2 bit is a next bit of the S1 bit as shown in FIG. 1B. Therefore, in the preferred embodiment of the invention a subsequent clock pulse of the one corresponding to the 88th gapping control signal is gapped or ungapped depending on whether the C2 bit is of the first or the second logic level.

Returning back to FIG. 6, the VC clock, basically regularly ungapped at the gapping device 620, is applied to the D F/F 630. The D F/F 630 delays the output of the gapping device 620 in accordance with the VC clock to thereby provide the gapped VC clock to the read address generator 430 shown in FIG. 4.

Referring back to the FIG. 4, the read address generator 430 generates a read address for each ungapped clock pulse of the gapped VC clock as in an identical manner as in the read address generator 230. The read address and a most significant bit thereof are provided to the buffer 420 and the control signal generator 450, respectively. At the buffer 420, the stored DS data is retrieved in accordance with the read addresses and transmitted to an overhead adder (not shown), wherein the overhead data is inserted among the retrieved data from the buffer 420 at the corresponding portion of the gapped VC clock pulses to provide a VC.

In the prior art, gapping of the VC clock is carried out by gapping consecutive clock pulses therein which corresponding to the overhead data, and, therefore, the duration of the gapped portion of the VC clock becomes much longer than the VC clock period, which tends to generate a jitter in the gapped VC clock and retrieved data from the buffer.

However, in the present invention, gapping of the VC clock is carried out by gapping regularly spaced clock pulses; and, therefore, the prolonged duration of the gapped portion of the VC clock in the prior art is removed and the possibility for the jitter generation can be significantly reduced.

It should be noted that although the gapping of the clock signal is described with reference to the VC in the preferred embodiment of the present invention, the same technique can be equally applied to the any of data packets, e.g., containers, tributary units and administrative units.

While the present invention has been described with respect to the preferred embodiments, other modifications and variations may be made without departing from the scope and spirit of the present invention as set forth in the following claims.

What is claimed is:

1. An apparatus for mapping digital signal data in a data packet of a packet clock having a plurality of clock pulses wherein the data packet is composed of information data and the digital signal data, the ratio of the number of bits of the information data with respect to the number of bits in the data packet being M/N with M and N being positive integers and the information data including overhead data bits and one or more data bits, the apparatus comprising:

means for counting the clock pulses to provide counted values;

means for generating M number of gapping control signals for every N clock pulses; and means for finding overhead data bits among the information data and gapping clock pulses corresponding to the overhead data bits in response to the gapping control signals.

2. The apparatus of claim 1, wherein the data packet is a virtual container-11.

3. The apparatus of claim 1, wherein the data packet is a virtual container-12.

4. An apparatus for mapping digital signal data in a preset data packet to generate synchronous transport module level data from the digital signal data, wherein the preset data packet is composed of information data and the digital signal data, the ratio of the number of bits of the information data with respect to the number of bits in the preset data packet being M/N with M and N being positive integers and the information data including overhead data bits and one or more data bits, the apparatus comprising:

means for generating a write address signal based on a packet clock having a plurality of clock pulses and storing the digital signal data in response to the write address signal;

means for counting clock pulses of the packet clock to provide counted values and generating M gapping control signals for every N counted values;

means for gapping clock pulses of the packet clock corresponding to the overhead data bits in the information data in response to the gapping control signals; and means for generating a read address signal for each ungapped clock pulse of the gapped clock of the preset data packet and reading the stored digital signal data in response to the read address signal to provide the digital signal data mapped in the preset data packet.

5. The apparatus of claim 4, wherein the gapping means further includes means for delaying the gapped clock pulses for a predetermined time period.

6. The apparatus of claim 5, wherein the preset data packet is a virtual container-11.

7. The apparatus of claim 5, wherein the preset data packet is a virtual container-12.

* * * * *